United States Patent [19]
Irie et al.

[11] Patent Number: 5,973,435
[45] Date of Patent: Oct. 26, 1999

[54] ROTARY ELECTRIC MACHINE HAVING AUXILIARY PERMANENT MAGNETS

[75] Inventors: Hitoshi Irie; Hiroaki Ishikawa, both of Nagoya, Japan

[73] Assignee: Denso Corporation, Kariya, Japan

[21] Appl. No.: 09/073,242

[22] Filed: May 6, 1998

[30] Foreign Application Priority Data

May 7, 1997 [JP] Japan .................................. 9-116947

[51] Int. Cl.[6] .................................................. H02K 19/22
[52] U.S. Cl. ........................... 310/263; 310/156; 310/261
[58] Field of Search ................................... 310/181, 263, 310/156, 261, 192, 254, 42, 45, 52; 29/598

[56] References Cited

U.S. PATENT DOCUMENTS

| 3,230,404 | 1/1966 | Graham | 310/263 |
| 4,617,485 | 10/1986 | Nakamura et al. | 310/65 |
| 5,483,116 | 1/1996 | Kusase et al. | 310/263 |
| 5,578,885 | 11/1996 | Alford et al. | 310/263 |

FOREIGN PATENT DOCUMENTS 3-265450  11/1991  Japan .............................. H02K 19/22

*Primary Examiner*—Nestor Ramirez
*Assistant Examiner*—Burton S. Mullins
*Attorney, Agent, or Firm*—Pillsbury Madison & Sutro LLP

[57] ABSTRACT

A rotor of an alternator having a plurality of claw poles, a plurality of auxiliary permanent magnets and a magnet holder for the permanent magnets. The magnet holder is composed of soft resinous holding members, connecting bands and heat-resistant members. Each of the heat resistant members is disposed between the claw poles and holding members to prevent heat transfer from the claw poles to the holding members.

11 Claims, 5 Drawing Sheets

# ROTARY ELECTRIC MACHINE HAVING AUXILIARY PERMANENT MAGNETS

CROSS REFERENCE TO RELATED APPLICATION

The present application is based on and claims priority from Japanese Patent Application Hei 9-116947, filed on May 7, 1997, the contents of which are incorporated herein by reference.

BACKGROUND OF THE INVENTION

1. Field of the Invention

The present invention relates to a rotor having auxiliary permanent magnets of a rotary electric machine, particularly, an alternator for a vehicle.

2. Description of the Related Art

A rotor of an alternator for vehicle is, generally, composed of a field coil and a plurality of claw poles. Recently, in order to increase the output power, auxiliary permanent magnets are installed between the claw poles to increase the field magnetic flux.

For example, JP-A-8-223882 discloses a rotor structure of such an alternator. However, because the permanent magnets are fixed directly to the claw poles, it is difficult to hold the permanent magnets under a high rotation speed. In order to solve this problem, JP-A-7-123664 proposes another rotor structure which is provided with a resinous magnet holder. The resinous magnet holder is molded with the permanent magnets and held between the claw poles.

As the output power increases, temperature rise of the alternator becomes higher. Particularly, temperature of the claw pole surfaces becomes significantly high because of increased eddy current as field magnetic flux is increased. This requires a resinous magnetic holder made of heat resistant material, which is generally expensive. A metal magnetic holder is also expensive, because it must be made from non magnetic metal such as stainless steel.

SUMMARY OF THE INVENTION

Therefore, a main object of the present invention to provide an improved and inexpensive rotor having a plurality of claw poles and auxiliary permanent magnets.

Another object of the present invention is to provide a rotor having an improved magnet holder.

According to a feature of the present invention, a rotor for an electric machine has a plurality of claw poles, a plurality of permanent magnets and a magnet holder, and the magnet holder comprises a plurality of magnet holding members, each of which has a heat-resistant member disposed at a limited portion between the claw pole and the permanent magnet. Each of the claw poles has flange portions on the opposite sides thereof for holding the heat-resistant members. Each of the holding members preferably has a portion disposed between the heat-resistant member and one of the permanent magnets. Each of the holding member can have a window for inserting one of the permanent magnets which is covered by the heat-resistant member.

According to another feature of the present invention, a rotor of a rotary electric machine has a plurality of claw poles, a plurality of permanent magnets and a magnet holder, and the magnet holder comprises a plurality of heat resistant magnet holding members and connecting members for connecting the magnet holding members. Each of the claw poles can have flange portions on the opposite sides for holding corresponding ones of the holding members.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

Figure 1:
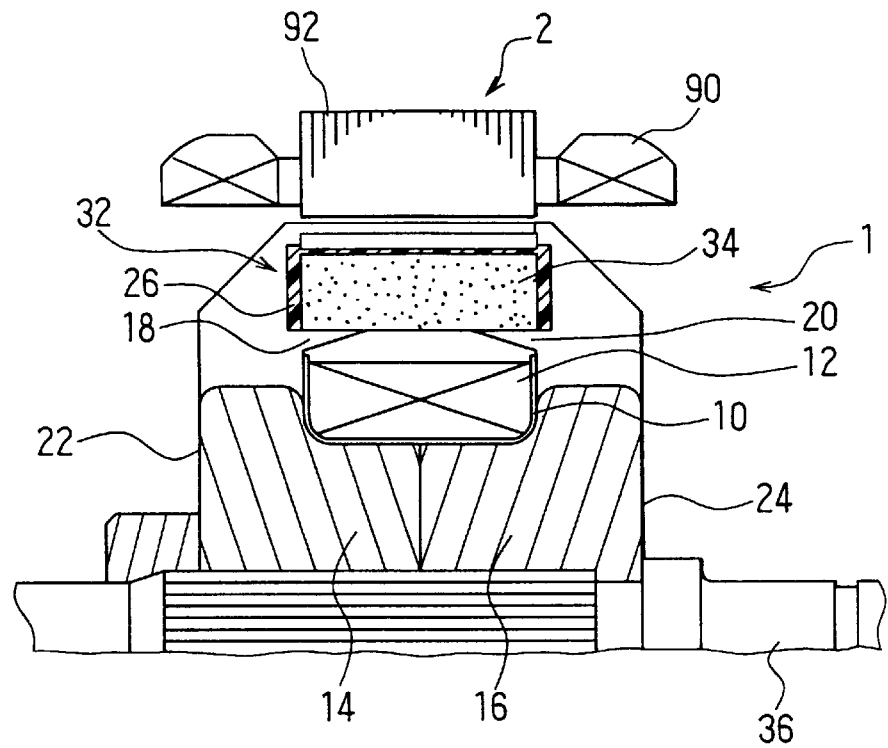
FIG. 1 is a fragmentary sectional view illustrating a main portion of an alternator according to a first embodiment of the present invention.

DETAILED DESCRIPTION OF THE PREFERRED EMBODIMENTS (First Embodiment)

A rotor of an alternator according to a first embodiment of the present invention is described with reference to FIGS. 1–6.

Rotor 1 is composed of field coil 12 which is wound on cylindrical bobbin 10, a pair of pole cores 22, 24, ring-shaped magnet holder 32 for twelve permanent magnets 34 and shaft 36. The pair of pole cores 22, 24, respectively, has center cores 14, 16 and six claw poles 18, 20 extending from respective center cores 14, 16, which is generally known. Ring-shaped magnet holder 32 has twelve holding members 26, twelve connecting bands 28 and twelve heat resistant members 30. Holding members 26 and connecting bands 28 are integrally formed of non-magnetic resinous material such as 46-nylon or polyphenylene sulfide (PPS). Heat resistant member 30 is made of nonmagnetic metal such as stainless steel or aluminum, however, it can be made of resinous material heat resistant at 250° C. or higher. In such a case, resinous heat resistant member 30 can be formed integrally with holding members 26. Permanent magnets 34 are made of ferrite magnets, neodymium magnets or rare earth magnets. Stator 2, which is generally well known, is composed of stator coil 90 and stator core 92.

Figure 2:
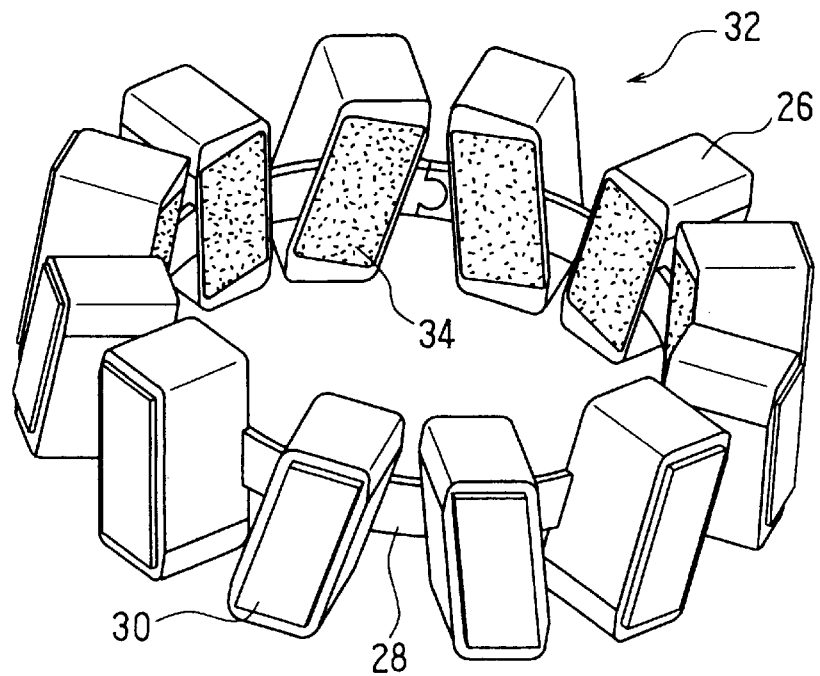
FIG. 2 is a perspective view illustrating permanent magnets in a magnet holder of the alternator according to the first embodiment.

As illustrated in FIG. 2, each of holding members 26 of magnet holder 32 has a box which has an opening and a concavity in which one of heat resistant members 30 is press-fitted. The opening of holding member 26 opens to radially inward so that permanent magnet 34 can be inserted through the opening and held by the bottom opposite the opening while rotor 1 is rotated. Heat resistant members 30 can be fixed by a different way, such as bonding or insert-molding. If heat resistant member 30 is formed out of aluminum plate, the surface thereof in contact with holding member 26 may be provided with a plurality of projections for reducing the contact area. Connecting bands 28 are integrally formed with holding members 26.

Figure 3:
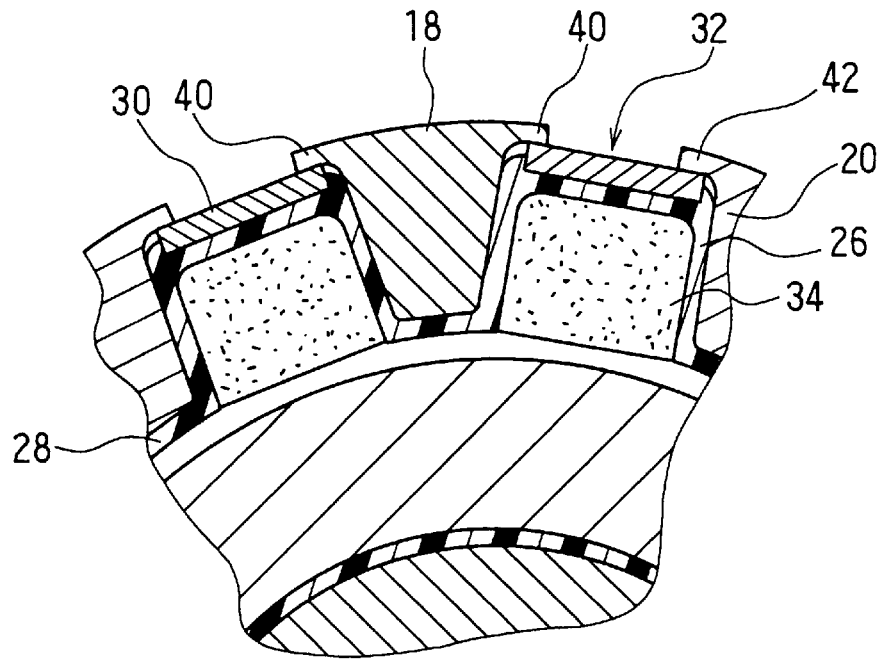
FIG. 3 is an enlarged fragmentary sectional view illustrating the rotor of the alternator according to the first embodiment.
Figure 4:
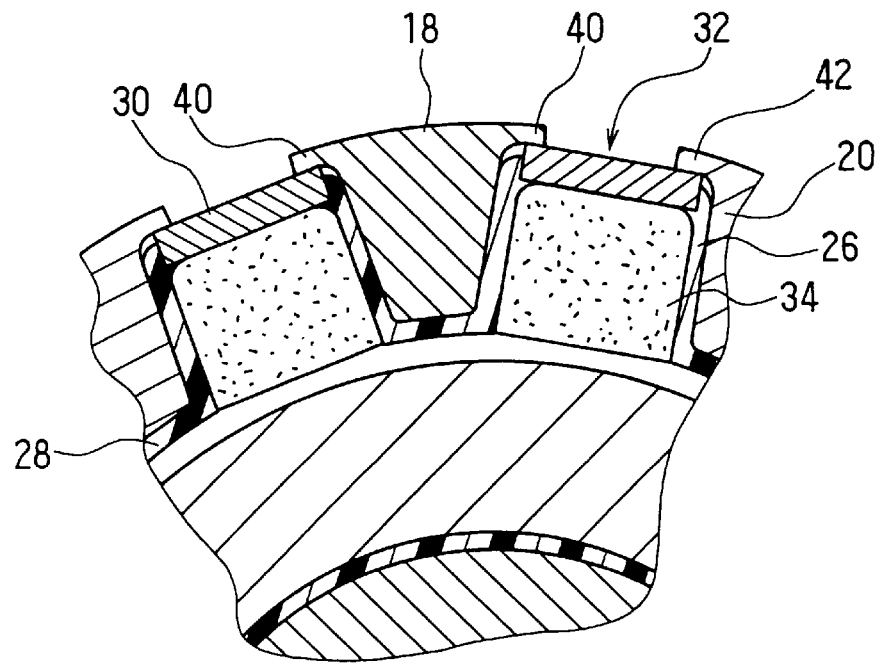
FIG. 4 is an enlarged fragmentary sectional view illustrating a variation of the rotor shown in FIG. 3.
Figure 5:
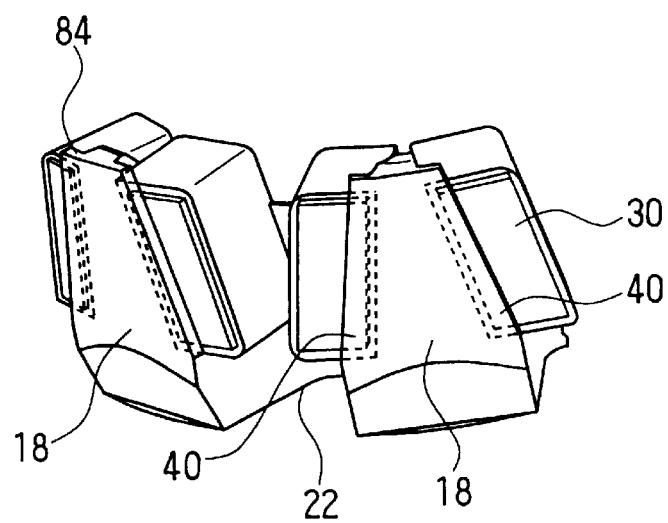
FIG. 5 is a fragmentary perspective view illustrating claw poles and the magnet holder assembled together.

Each of claw poles 18, 20 has flanges 40, 42 on the circumferentially opposite sides thereof, and each of opposite sides of heat resistant members 30 is disposed between one of holding members 26 and one of flanges 40, 42, so that holding members 26 are not in direct contact with flange portions 40, 42 as shown in FIG. 3. Thus, flanges 40, 42 hold magnet holder 32 securely against centrifugal force during operation as shown in FIG. 5. Flanges 40, 42 also increases magnetic permeance between rotor 1 and stator 2, thereby increasing the output power of the alternator. Heat resistant member 30 can be placed in contact with permanent magnet 34 as shown in FIG. 4 to directly hold permanent magnet 34 against centrifugal force during rotation of the rotor.

Thus, because magnet holder 32 is isolated by heat resistant members 30 from claw poles, it can be made of soft resinous material which is not expensive or necessarily heat resistant so that precise machining can be omitted. Permanent magnets 34 are magnetized to reduce the leakage flux between adjacent claw poles 18, 20.

Figure 6:
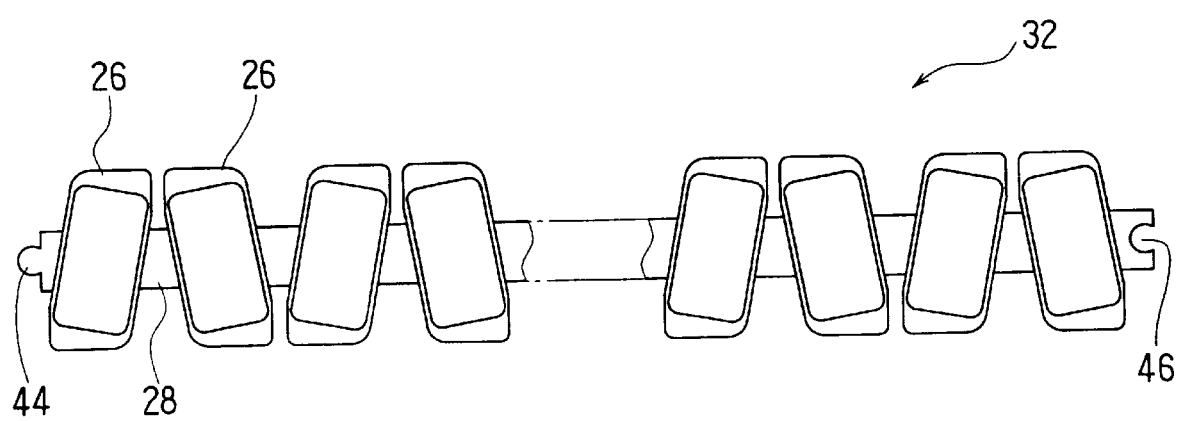
FIG. 6 is a plan view illustrating the magnet holder before it is assembled.

Ring-shaped magnet holder 32 is formed from a mold of chained holding members 26, and one of connecting bands 28 extending from one end of the mold is provided with a projection 44 and another of connecting band 28 extending from the other end of the mold is provided with a concavity 46 at the other end as shown in FIG. 6. Projection 44 is fitted into concavity 46 to form ring-shaped holder 32. The connection can be substituted by welding, bonding or the like.

Figure 7:
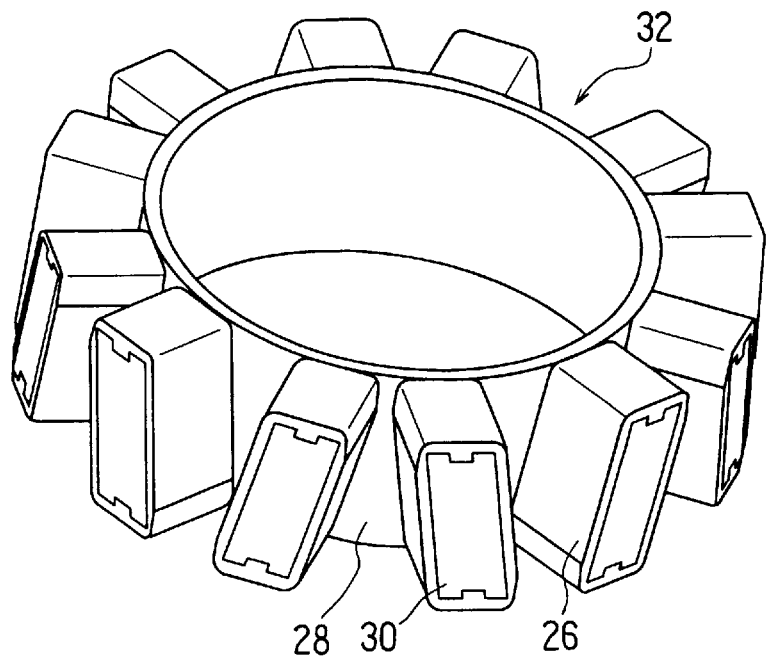
FIG. 7 is a perspective view illustrating a variation of the magnet holder of the alternator according to the first embodiment.
Figure 8:
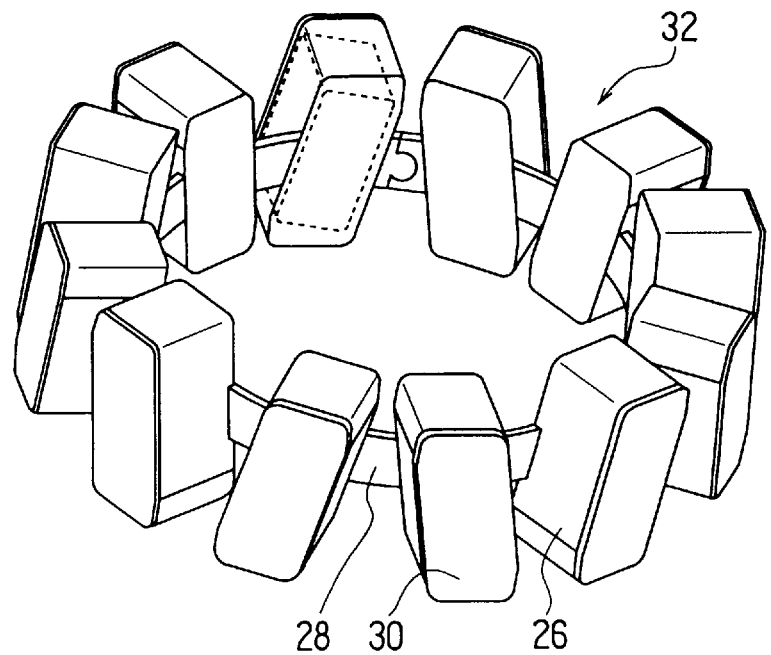
FIG. 8 is a perspective view illustrating another variation of the magnet holder of the alternator according to the first embodiment.

As a variant, ring-shaped magnet holder 32 is molded as illustrated in FIG. 7. Another variant of magnet holder 32 having non-magnetic-metal heat-resistant member 30 is illustrated in FIG. 8. Each of holding members 26 has opening opens radially outward, and the heat resistant members 30 are fixed to the openings after permanent magnets 34 are inserted therethrough into holding members 26.

(Second Embodiment)

Figure 9:
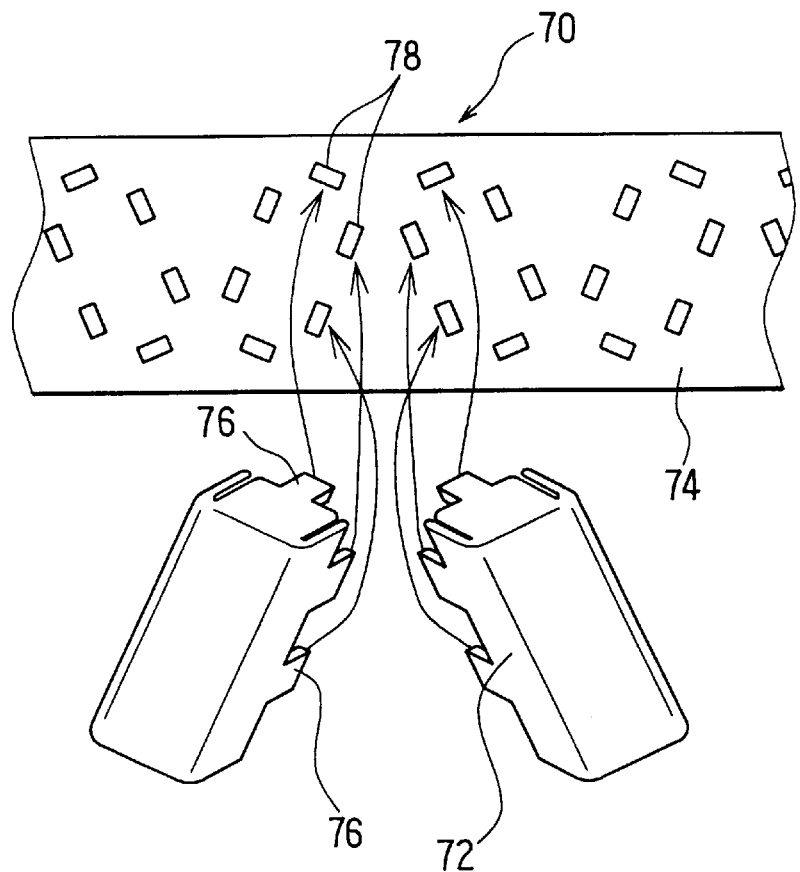
FIG. 9 is a fragmentary exploded view illustrating a magnet holder of an alternator according to a second embodiment of the present invention.

A rotor having auxiliary permanent magnets according to a second embodiment of the present invention is described with reference to FIG. 9. Magnet holder 70 is composed of twelve box-like holding members 72 and connecting band 74. Holding members 72 are made of nonmagnetic metal such as stainless steel or aluminum. Each of holding members has an opening and a plurality of projections 76 extending the periphery of the opening. Connecting band 74 is made of soft resinous material such as 46-nylon or PPS and has a plurality of notches to which projections 76 are press-fitted. Other portions of the rotor are substantially the same.

In assembling, each of the permanent magnets is inserted into corresponding one of holding members 72 through the opening thereof, and holding members 72 with the permanent magnets therein are fixed to connecting band 74 by projections 76 press-fitted into notches 78. Thereafter, connecting band 74 is formed into a ring.

Figure 10:
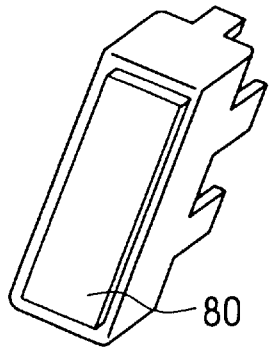
FIG. 10 is a perspective view illustrating a variation of a part of the magnet holder shown in FIG. 9.
Figure 11:
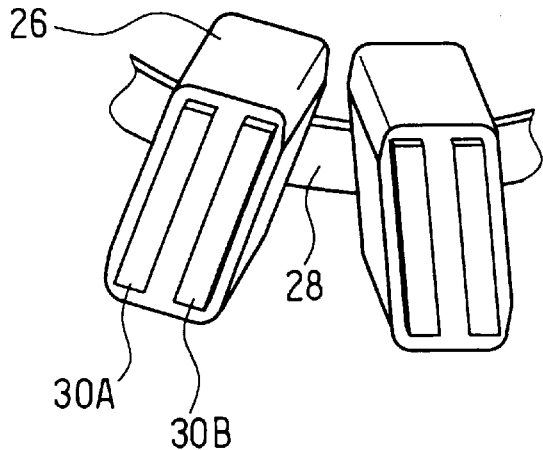
FIG. 11 a perspective view illustrating another variation of a part of the magnet holder shown in FIG. 9.

A portion of each of holding members 72 can be made of non-heat-resistant resin. In this case, a portion 80 in contact with the claw pole is made of heat resistant material as illustrated in FIG. 10. The portion 80 can be divided into two pieces 30A, 30B as shown in FIG. 11. In this case two pieces 30A, 30B can be made of inexpensive material such as iron or steel.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotor of a rotary electric machine comprising a pole core having a plurality of claw poles, a plurality of permanent magnets each of which is disposed between consecutive ones of said claw poles and a magnet holder for each of said permanent magnets, wherein said magnet holder comprises a plurality of magnet-holding members and a plurality of heat-resistant members made of a material more heat-resistant than said holding member, and said heat resistant members have surfaces respectively disposed between said claw poles and said holding members to thermally isolate said holding members from said claw poles and to hold the same against centrifugal forces applied thereto during operation.

2. The rotor as claimed in claim 1, wherein each of said claw poles has flange portions on the opposite sides thereof for holding said heat-resist members.

3. The rotor as claimed in claim 1, wherein each of said heat-resistant member is disposed to hold one of said permanent magnets against centrifugal force.

4. The rotor as claimed in claim 1, wherein, each of said holding members is provided with an opening for inserting one of said permanent magnets opening to the radially outside, and said opening is covered by said heat-resistant member.

5. The rotor as claimed in claim 1, wherein said heat resistant member comprises a separate member.

6. The rotor as claimed in claim 1, wherein at least a number of said holding members are connected by band members.

7. The rotor as claimed in claim 1, wherein each of said holding members defines a box in which one of said permanent magnets is inserted.

8. A rotor comprising a pole core having a plurality of claw poles, a plurality of permanent magnets each of which is disposed between consecutive ones of said claw poles and a magnet holder for each of said permanent magnets, wherein said magnet holder comprises a plurality of heat resistant magnet holding members and connecting members for connecting said magnet holding members, and said magnet holding members are made of a material more heat-resistant than said connecting members.

9. The rotor electric machine as claimed in claim 8, wherein each of said claw poles has flange portions on the opposite sides thereof for holding corresponding ones of said holding members.

10. The rotor as claimed in claim 8, wherein said connecting member is made of a softer material than said magnet holding members.

11. The rotor as claimed in claim 8, wherein each of said holding members defines a box in which one of said permanent magnets is inserted.

* * * * *